United States Patent
Smith et al.

(10) Patent No.: US 6,925,370 B2
(45) Date of Patent: Aug. 2, 2005

(54) AUTOMOTIVE SYSTEM INCLUDING A BACK-UP AID WITH PARKING ASSIST

(75) Inventors: Matthew R. Smith, Westfield, IN (US); Harry Zhang, Carmel, IN (US); Gregory K. Scharenbroch, Kokomo, IN (US); Gerald J. Witt, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/679,744

(22) Filed: Oct. 6, 2003

(65) Prior Publication Data

US 2005/0075788 A1 Apr. 7, 2005

(51) Int. Cl.[7] .............................................. G06F 7/00
(52) U.S. Cl. ......................... 701/36; 701/36; 701/121; 180/168; 340/435; 340/436; 340/903
(58) Field of Search ........................ 701/36, 119, 121; 180/168, 170, 204; 340/435, 436, 903

(56) References Cited

U.S. PATENT DOCUMENTS

| | | | | |
|---|---|---|---|---|
| 6,483,442 B2 | * | 11/2002 | Shimizu et al. | 340/932.2 |
| 6,611,744 B1 | * | 8/2003 | Shimazaki et al. | 701/41 |
| 2002/0104700 A1 | * | 8/2002 | Shimazaki et al. | 180/204 |

* cited by examiner

*Primary Examiner*—Gertrude A. Jeanglaude
(74) *Attorney, Agent, or Firm*—Stefan V. Chmielewski

(57) ABSTRACT

A technique for combining a back-up aid function with a park assist function in a motor vehicle initially includes determining a distance from a motor vehicle to an object. Next, a velocity of the motor vehicle is determined. Then, a scaled version of the velocity and a minimum distance threshold are subtracted from the distance to provide a first multiplicand. Finally, a driver stimulus is provided as a function of the first multiplicand.

20 Claims, 2 Drawing Sheets

AUTOMOTIVE SYSTEM INCLUDING A BACK-UP AID WITH PARKING ASSIST

TECHNICAL FIELD

The present invention is generally directed to an automotive system and, more specifically, an automotive system including a back-up aid with parking assist.

BACKGROUND OF THE INVENTION

Increasingly, vehicle manufacturers are installing safety devices in vehicles to enable drivers to drive in a safer more efficient manner. For example, some manufactures have included forward looking systems (FLSs), rear detection systems (RDSs) and side detection systems (SDSs) within certain vehicle models. An adaptive cruise control (ACC) system is one example of a FLS.

A typical ACC system uses a radar sensor (some use laser sensors), mounted at the front of the vehicle, to detect objects in the forward path of the vehicle. If the lane ahead is clear, the ACC system maintains a set vehicle speed. However, when a slower vehicle is detected, the ACC system maintains a driver selected distance (using throttle control and limited braking) between the vehicles. A typical ACC system uses mechanically scanned radar sensors, which normally improves the ability of the system to detect targets (i.e., vehicles) in heavy traffic. A typical commercially available ACC system has a range of 150 meters, an azimuth of 15 degrees and updates at a 10 Hz rate. An ACC system generally determines a range of a detected object, as well as the relative speed of the detected object.

SDSs detect objects that are at a side of a vehicle (i.e., in a driver's blind spot). A typical SDS includes a radar sensor that is mounted in each rear quarter panel of the vehicle. Each radar sensor is designed to detect objects in an adjacent lane. In this manner, the SDS can provide a visual indication to the driver to warn of objects in the driver's blind spot.

An example of an RDS is a back-up aid (BUA) or a reverse sensing system. BUAs may be used as short range parking aids and have included visual and audible alarms to warn a driver of an impending collision. A typical BUA system includes a radar sensor that provides a rear detection range of up to 6 meters. Some BUAs also include ultrasonic sensors that provide bumper coverage. A typical BUA is activated when a vehicle is put into a reverse gear and is useful for backing at higher speeds. A typical park-assist system is useful for parallel parking and backing in and out of parking spaces.

Short-range park-assist systems have generally implemented algorithms that respond based on a distance to a detected object, while longer-range BUA systems have generally implemented algorithms that respond to time-to-collision criteria in determining when to alert a driver. While it is desirable for a BUA system to provide both warning and park assist functions, switching between the functions has the potential for confusing a driver when the system changes between short-range and longer-range functions.

What is needed is a BUA system that provides both warning and park assist functions in a manner that reduces confusion of a driver.

SUMMARY OF THE INVENTION

An embodiment of the present invention is generally directed to a technique for combining a back-up aid function with a park assist function in a motor vehicle. Initially, a distance from a motor vehicle to an object is determined. Next, a velocity of the motor vehicle is determined. Then, a scaled version of the velocity and a minimum distance threshold are subtracted from the distance to provide a first multiplicand. Finally, a driver stimulus is provided as a function of the first multiplicand. It should be appreciated that the scaled version of the velocity may take several forms. For example, the scaled version of the velocity may be the product of a time-to-collision threshold multiplied by the velocity or the product of an estimated driver reaction time multiplied by the velocity.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
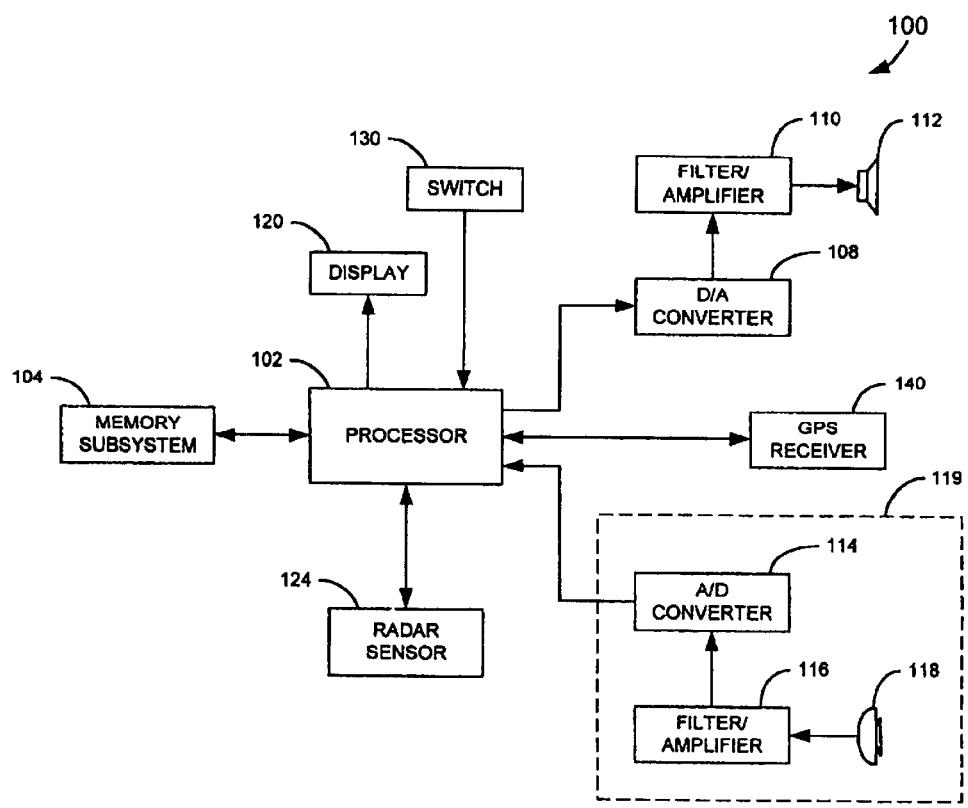
FIG. 1 is a block diagram of an exemplary automotive system that may include a back-up aid with park assist, according to an embodiment of the present invention.

FIG. 1 depicts a block diagram of an exemplary back-up system 100 that is implemented within a motor vehicle (not shown) that detects when the motor vehicle is placed in a reverse direction, i.e., a reverse gear. As shown, the system 100 includes a processor 102 coupled to a radar sensor 124, e.g., a 17 GHz single beam radar sensor, a switch 130 that provides an indication when the motor vehicle is shifted to a reverse gear and a display/monitor 120.

The processor 102 provides audible driver stimulus via the speaker 112 and may also supply various information to the driver via the display 120. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). The processor 102 is also coupled to a memory subsystem 104, which includes an application appropriate amount of memory (e.g., volatile and non-volatile memory), which provides storage for various routines that may be used to determine the distance to a sensed object and a velocity of the motor vehicle. The memory subsystem 104 may also provide a storage area for one or more speech recognition applications.

As is also shown in FIG. 1, an audio input device 118 (e.g., a microphone) is coupled to a filter/amplifier module 116. The filter/amplifier module 116 filters and amplifies a voice input provided by a user through the audio input device 118. This voice input may be utilized to control various automotive accessories positioned in/on the motor vehicle. The filter/amplifier module 116 is also coupled to an analog-to-digital (A/D) converter 114, which digitizes the voice input from the user and supplies the digitized voice to the processor 102 which may execute a speech recognition application, which causes the voice input to be compared to system recognized commands. In general, the audio input device 118, the filter/amplifier module 116 and the A/D converter 114 form a voice input circuit 119.

The processor 102 may execute various routines in determining whether the voice input corresponds to a system recognized command and/or a specific operator. The processor 102 may also cause an appropriate output, e.g., a warning tone or synthesized voice warning to be provided to the user through an audio output device 112. Synthesized voice output may be provided by the processor 102 to a digital-to-analog (D/A) converter 108. The D/A converter 108 is coupled to a filter/amplifier section 110, which amplifies and filters the analog voice output. The amplified and filtered output is then provided to audio output device 112 (e.g., a speaker).

As shown, the processor 102 is also coupled to a global positioning system (GPS) receiver 140, which allows the system 100 to determine a location and velocity of the motor vehicle.

Figure 2:
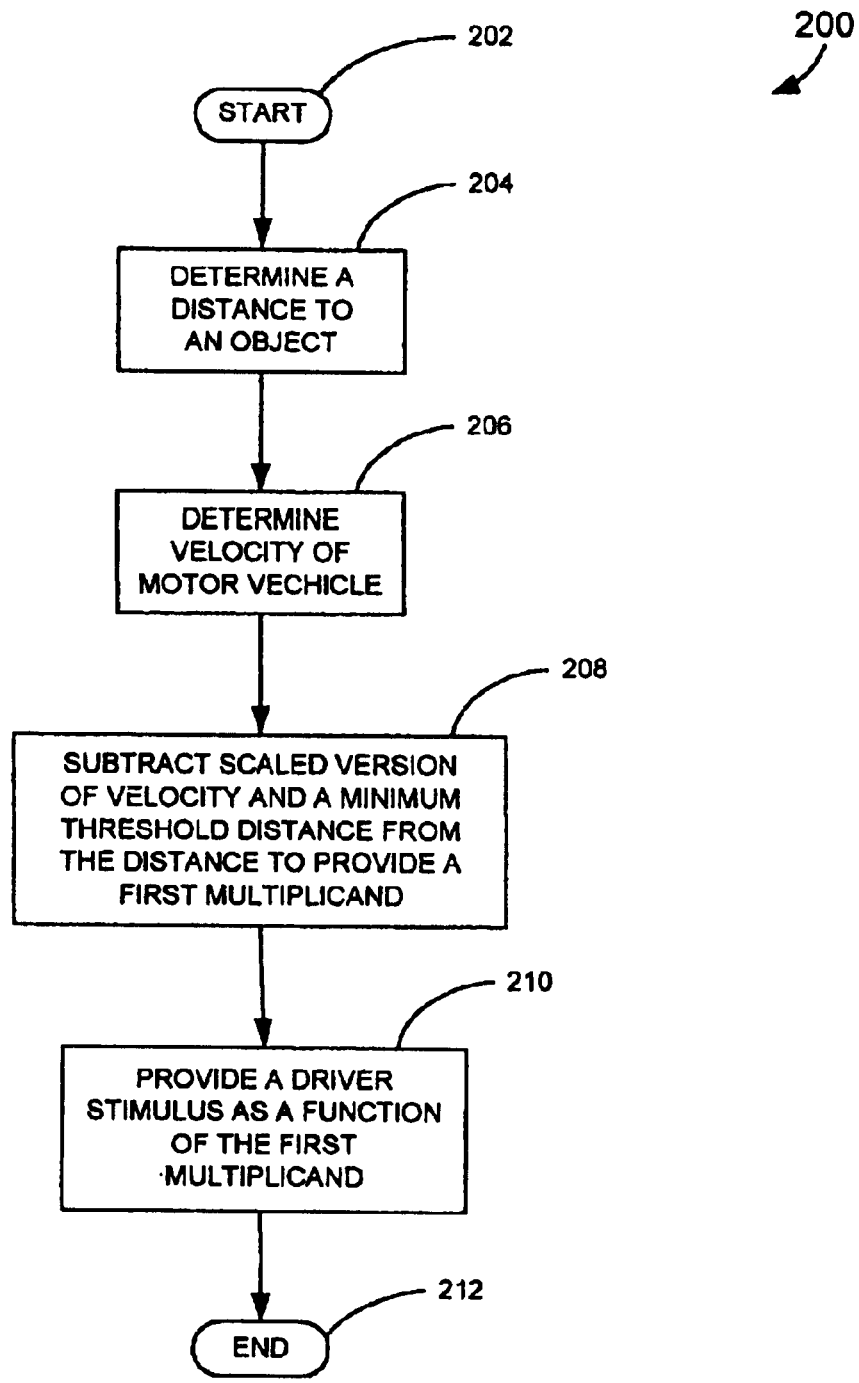
FIG. 2 is a flow diagram of a routine for implementing various embodiments of the present invention.

FIG. 2 depicts a routine 200 for combining a back-up aid function with a park assist function according to one embodiment of the present. In step 202, the routine 200 is initiated, at which point control transfers to step 204. In step 204, the processor 102 actuates the radar sensor 124 to determine a distance from the motor vehicle to a detected object. Next, in step 206, the processor 102 determines the velocity of the motor vehicle. It should be appreciated that the velocity may be determined in a number of different ways, such as by using a wheel speed sensor or utilizing multiple readings provided by a GPS receiver over a known time period. Then, in step 208, a scaled version of the velocity and a minimum threshold distance are subtracted from the distance to provide a first multiplicand. Next, in step 210, a driver stimulus is provided as a function of the first multiplicand. It should be appreciated that the driver stimulus may be an auditory stimulus provided via speaker 112 or may be a visual stimulus provided via the display 120, among other stimuluses. Then, in step 212, the routine 200 terminates. It should be noted that the routine 200 is normally only implemented whenever the motor vehicle is in a reverse gear.

The scaled version of the velocity may take various forms, e.g., the product of a time-to-collision threshold multiplied by the velocity or the product of an estimated driver reaction time multiplied by the velocity. According to another embodiment, the first multiplicand is multiplied by a proportionality constant. Thus, according to the present invention, a single quickening algorithm may be used to provide continuous prediction of where the driver will be in one reaction time, which allows the system to fulfill both park assist and back-up aid functions. An example of one such algorithm is depicted below.

$$IPI = k_1(r - k_2 V - k_3)$$

$$SI = k_0 - [k_1(r - k_2 V - k_3)]$$

where IPI is an inter pulse interval of an auditory stimulus and SI is a warning stimulus intensity, for example, audio volume, number of lights, etc.; r is a distance to a sensed object and V is a vehicle velocity; $k_0$ and $k_1$ are proportionality constants; $k_2$ is a time-to-collision threshold or an estimate of a driver's reaction time, e.g., 1.5 seconds; and $k_3$ is a minimum distance threshold. It should be noted that the expression reduces to zero when the range in one reaction time ($r - k_2 V$) is equal to $k_3$. Thus, at low speeds the algorithm behaves like a distance algorithm, but at high speeds the algorithm behaves like a time-to-collision algorithm, with smooth transitions in between. Further, it should be appreciated that one may use a driver reaction time as a time-to-collision threshold. That is, mathematically $k_2$ can broadly be thought of as a time-to-collision threshold.

Accordingly, a human-machine interface has been described herein which provides consistent feedback to a user of an automotive system including an integrated back-up aid with parking assist. In a typical automotive application, $k_1$ may be set to about 0.3, $k_2$ may be set to about 1.5 and $k_3$ may be set to about 0.5. It should be appreciated $k_1$ may greatly vary depending upon the type of stimulus. For example, a value of 0.3 may be appropriate for an IPI implementation but may not be appropriate for an SI implementation (e.g., light intensity, some type of length and sound volume). It should also be appreciated that the buffer distance or the minimum distance threshold is a constant distance between the vehicle and a detected object at which a tone, or other stimulus, provided by the automotive subsystem becomes substantially continuous.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method for combining a back-up aid function with park assist function in a motor vehicle, comprising the steps of:
    determining a distance from a motor vehicle to an object;
    determining a velocity of the motor vehicle;
    subtracting a scaled version of the velocity and a minimum distance threshold from the distance to provide a first multiplicand; and
    providing a driver stimulus as a function of the first multiplicand.

2. The method of claim 1, wherein the scaled version of the velocity is the product of a time-to-collision threshold multiplied by the velocity.

3. The method of claim 1, wherein the scaled version of the velocity is the product of an estimated driver reaction time multiplied by the velocity.

4. The method of claim 1, wherein the driver stimulus is an auditory stimulus.

5. The method of claim 1, wherein the velocity of the motor vehicle is provided by a wheel speed sensor.

6. The method of claim 1, wherein the distance from the motor vehicle to the object is determined from signals provided by a radar sensor.

7. The method of claim 1, further including the step of:
    multiplying the first multiplicand by a proportionality constant.

8. An automotive system including a back-up aid with parking assist, the system comprising:
    a processor;
    a sensor coupled to the processor; and
    a memory subsystem coupled to the processor, the memory subsystem storing code that when executed by the processor causes the processor to perform the steps of:
        determining a distance from a motor vehicle to an object based upon output provided by the sensor;
        determining a velocity of the motor vehicle;
        subtracting a scaled version of the velocity and a minimum distance threshold from the distance to provide a first multiplicand; and
        providing a driver stimulus as a function of the first multiplicand.

9. The system of claim 8, wherein the scaled version of the velocity is the product of a time-to-collision threshold multiplied by the velocity.

10. The system of claim 8, wherein the scaled version of the velocity is the product of an estimated driver reaction time multiplied by the velocity.

11. The system of claim 8, wherein the driver stimulus is an auditory stimulus.

12. The system of claim 8, wherein the velocity of the motor vehicle is provided by a wheel speed sensor.

13. The system of claim 8, wherein the sensor is a radar sensor.

14. The system of claim 8, wherein the code when executed by the processor causes the processor to perform the additional step of:

multiplying the first multiplicand by a proportionality constant.

15. An automotive system Including a human-machine interface that provides a back-up aid with parking assist, the system comprising:

a processor;

a sensor coupled to the processor; and a memory subsystem coupled to the processor, the memory subsystem storing code that when executed by the processor causes the processor to perform the steps of:

determining a distance from a motor vehicle to an object based upon output provided by the sensor;

determining a velocity of the motor vehicle;

subtracting a scaled version of the velocity and a minimum distance threshold from the distance to provide a first multiplicand;

multiplying the first multiplicand by a proportionality constant; and providing a driver stimulus as a function of the product of the first multiplicand and the proportionality constant.

16. The system of claim 15, wherein the scaled version of the velocity is the product of a time-to-collision threshold multiplied by the velocity.

17. The system of claim 15, wherein the scaled version of the velocity is the product of an estimated driver reaction time multiplied by the velocity.

18. The system of claim 15, wherein the driver stimulus is an auditory stimulus.

19. The system of claim 15, wherein the velocity of the motor vehicle is provided by a wheel speed sensor.

20. The system of claim 15, wherein the sensor is a radar sensor.

* * * * *